2 Sheets—Sheet 1.

J. P. MOLITOR.
Barber's Appliance.

No. 205,495. Patented July 2, 1878

Witnesses:
W. D. Clark
Will B. Schwartz

Inventor:
John P. Molitor
by Jno L. Boone
his Attorney.

N. PETERS, PHOTO-LITHOGRAPHER, WASHINGTON, D.C.

2 Sheets—Sheet 2.

J. P. MOLITOR.
Barber's Appliance.

No. 205,495.      Patented July 2, 1878.

Witnesses:
W. D. Clark
Will B. Schwartz

Inventor:
Jno. P. Molitor
by Jno. L. Boone
his Attorney.

UNITED STATES PATENT OFFICE.

JOHN P. MOLITOR, OF VALLEJO, CALIFORNIA.

IMPROVEMENT IN BARBERS' APPLIANCES.

Specification forming part of Letters Patent No. 205,495, dated July 2, 1878; application filed April 13, 1878.

*To all whom it may concern:*

Be it known that I, JOHN P. MOLITOR, of Vallejo, county of Solano, in the State of California, have invented an Improved Tonsorial Cabinet; and I do hereby declare that the following is a full, clear, and exact description thereof, reference being had to certain drawings accompanying this specification and forming a part thereof.

My invention has reference to a box or chest for containing the tools and implements used by barbers for shaving purposes, and I call it a " Tonsorial Cabinet."

Besides being a neat article of furniture, the cabinet is arranged to contain one or more shaving-cups, lather-papers, razors, and the strops upon which the razors are sharpened. The strops are mounted upon spring-rollers inside of the box or chest, and one end of each strop projects through an opening in the side of the case, so that the length of the strop can be drawn outside of the box when it is required for use.

I have also devised a novel method for securing the cabinet upon a table, counter, or shelf, and an arrangement for retaining the strops in their extended position, all as hereinafter more fully described.

Figure 1:
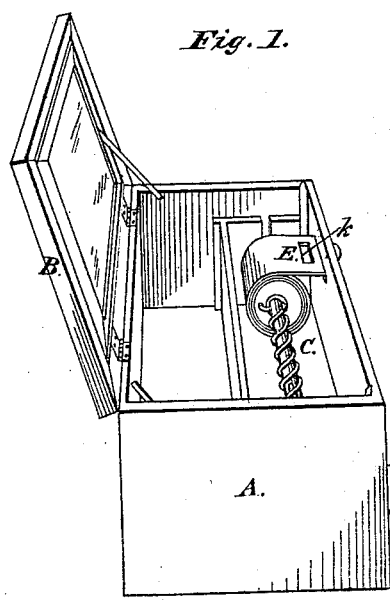
Figure 3:
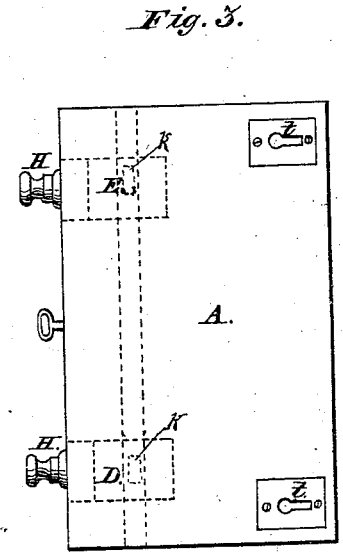
Figure 2:
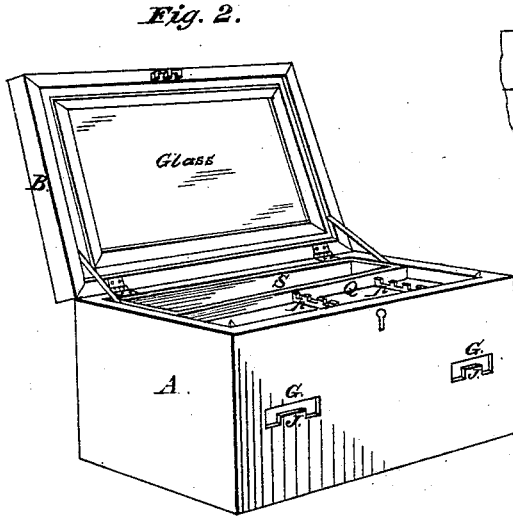
Figure 4:
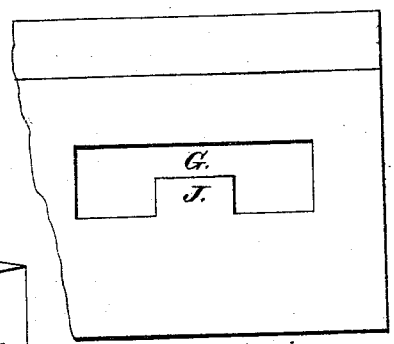
Figure 1:
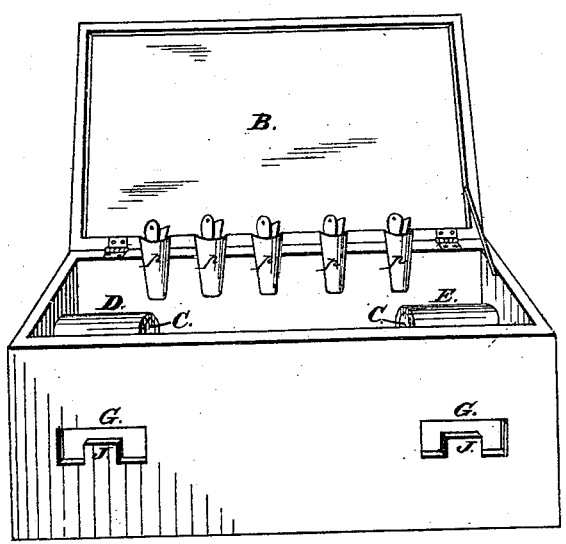

Referring to the accompanying drawings, Figure 1, Sheet I, is a perspective, showing interior of cabinet. Fig. 2 is a perspective, showing front and interior. Figs. 3 and 4 show the arrangement of strops and openings. Fig. 1, Sheet II, shows a simple arrangement with strops and razor-pockets.

Let A represent a box, chest, or cabinet of any desired size and shape. This box or chest is provided with a lid or hinged top, B, the under side of which has a looking-glass placed in it, and the lid or top has a stop which supports it in an upright position, or at the desired angle when it is open.

In the front part of the box, near its bottom, I mount two rollers, C C, to one of which I secure one end of a canvas strop, D, while to the other I secure one end of a leather strop, E. A spring, F, is arranged in connection with each roller, so as to rotate it in one direction and wind the strop upon it inside the case. The opposite end of each strop passes through an opening, G, in the front of the case, and has a handle, H, and stop-plate I secured to its extremity. The roller inside will roll up the strop until the stop-plate strikes the front of the box, leaving the handle H projecting outside. By drawing outward upon the handle the strop is drawn out for use.

To prevent the strop from being drawn into the box every time the handle is released, I make a projection, J, on the lower edge of the opening G, through which the strop passes. I then make a corresponding hole or perforation, *k*, in the strop at the point where it is to be stopped, so that when it has been drawn out the hole or perforation will drop over the projection or lug and hold the strop against the spring. To release the strop and allow it to be drawn into the box by the spring, it is lifted off the projection J. This is an important improvement, as it would be quite inconvenient to have the strop drawn into the box every time the handle was released. The strops can then either be left hanging from the box, or they can be allowed to roll up inside of the box. When rolled up inside of the box they are protected from dirt and dust and kept in good condition.

To avoid the necessity of having to fasten the cabinet permanently to some stationary object, I make one or more key-hole openings or slots, *t*, in its bottom, close to its rear edge, as shown at Fig. 3. I then secure as many screws in a table, counter, or shelf as there are slots in the box, being careful to place them at the proper distance apart to correspond with the slots. I leave the heads of these screws projecting slightly, so that they can enter the wide part of the slots when the box is dropped over them. Then, by drawing the cabinet forward, so as to force the screws into the narrow part of the slots, I firmly fasten the box to the table, counter, or shelf.

It will then be an easy matter to remove the cabinet, as it is only necessary to move it backward, so as to shift the screw-heads into the wide part of the slots, and the cabinet can be lifted off. This practically makes the cabinet portable, and at the same time provides for immediately making it permanent. It is necessary that the cabinet be permanent when the strops are being used, in order to resist the pull upon them; and it is convenient to have it portable, so that it can be put out of the way when it is not needed.

Inside of the cabinet, over the rollers, I place a narrow tray, Q, which is about half as wide as the box, and which rests upon strips or cleats at each end. In this tray I make two or more racks, $p$, upon which a number of razors can be placed.

Behind the tray Q, I place another shallow tray, S, in the same way, leaving a large chamber below it, in which shaving-cups, soap, or other articles of tonsorial toilet can be placed.

This cabinet has ample capacity for containing all the implements of a barber's trade, so that they will be kept in good order. It can also be locked up, so as to serve as a safe to prevent the implements from being used by unauthorized persons, and can be carried home by the barber every night, if he wishes. Besides these advantages, it forms a neat article of furniture.

Having thus described my invention, what I claim, and desire to secure by Letters Patent, is—

1. The box or cabinet A, with its lid or hinged cover B, and having the strops D, mounted upon the spring-rollers C inside of it, said box being provided with the openings G, through which the strops are drawn, substantially as and for the purpose above described.

2. The box or cabinet A, having the openings G, with their projections J, in combination with the strops C, with their openings G, said strops being mounted upon spring-rollers inside of the box, so as to be drawn out through the openings G, and retained or latched upon the projections J, substantially as and for the purpose described.

3. The tonsorial cabinet A, having the strops D, mounted upon spring-rollers C inside of it, said strops being arranged to be drawn outside of the box or case, in combination with the key-hole openings or slots $p$ in the bottom of the cabinet, substantially as and for the purpose herein specified.

4. The box or chest A, with its openings G, and having the strops D, mounted upon spring-rollers C inside of it, so as to be drawn out through said openings, and having the key-hole slots $p$ in its bottom, and the trays Q S, placed inside of it, all combined and arranged to operate substantially as and for the purpose above described.

In witness whereof I have hereunto set my hand and seal.

JOHN P. MOLITOR. [L. S.]

Witnesses:
H. MORRIS,
C. H. HUBBS.